(12) United States Patent
Liu

(10) Patent No.: US 9,588,553 B1
(45) Date of Patent: Mar. 7, 2017

(54) PROTECTIVE SHELL FOR TABLET PERSONAL COMPUTER

(71) Applicant: WING TAK LEE SILICONE RUBBER TECHNOLOGY (SHENZHEN) CO., LTD, Shenzhen, Guangdong (CN)

(72) Inventor: Tak Nam Liu, Guangdong (CN)

(73) Assignee: WING TAK LEE SILICONE RUBBER TECHNOLOGY (SHENZHEN) CO., LTD, Shenzhen (CN)

(*) Notice: Subject to any disclaimer, the term of this patent is extended or adjusted under 35 U.S.C. 154(b) by 0 days.

(21) Appl. No.: 15/088,150

(22) Filed: Apr. 1, 2016

(30) Foreign Application Priority Data

Mar. 28, 2016 (CN) .......................... 2016 1 0182107

(51) Int. Cl.
| | |
|---|---|
| *H04M 1/18* | (2006.01) |
| *G06F 1/18* | (2006.01) |
| *A45C 11/00* | (2006.01) |

(52) U.S. Cl.
CPC .............. *G06F 1/181* (2013.01); *A45C 11/00* (2013.01); *A45C 2011/003* (2013.01)

(58) Field of Classification Search
CPC ................................ H04M 1/06; G06F 1/181
See application file for complete search history.

(56) References Cited

U.S. PATENT DOCUMENTS

| | | | |
|---|---|---|---|
| 9,136,897 B2* | 9/2015 | Hynecek .............. | H04B 1/3888 |
| 2010/0116387 A1* | 5/2010 | Channey ................ | A45C 11/00 150/165 |
| 2011/0095033 A1* | 4/2011 | Hung ..................... | A45C 11/00 220/602 |
| 2015/0295618 A1* | 10/2015 | Johnson ................ | H04M 1/185 455/575.8 |
| 2016/0204817 A1* | 7/2016 | Kim ..................... | H04B 1/3888 455/575.8 |

* cited by examiner

*Primary Examiner* — Bobbak Safaipour

(57) ABSTRACT

Disclosed is a protective shell for a tablet personal computer. The protective shell comprises: a protective film, a limiting frame and a protective shell body; wherein the protective film is arranged at an upper portion of the limiting frame, four sides on a frame body inner side surface of the limiting frame being each provided with a limiting bar; a contact portion of the limiting frame and the protective film is in a horizontal plane, the limiting bar being operable to limit the tablet personal computer to prevent the tablet personal computer from moving in the limiting frame; and the limiting frame is fixed in a snap-fit manner to the protective shell body. The technical solution according to the present invention has the advantage of a better protection effect.

8 Claims, 3 Drawing Sheets

PROTECTIVE SHELL FOR TABLET PERSONAL COMPUTER

CROSS-REFERENCE TO RELATED APPLICATIONS

The present application claims the benefit of Chinese Patent Application No. 201610182107.1 filed on Mar. 28, 2016, the contents of which are hereby incorporated by reference.

TECHNICAL FIELD

The present invention relates to the field of smart device accessories, and in particular, relates to a protective shell for a tablet personal computer.

BACKGROUND

A tablet personal computer (also, tablet PC, flat PC, tablet, or slates) is also called a portable personal computer. It is a small-sized personal computer which is convenient to carry, and uses a touch screen as a basic input device. The tablet personal computer has a touch screen (also called the graphic tablet technology), which allows a user to operate by using a stylus or a digital pen instead of using a traditional keyboard or mouse. The user may make inputs by means of built-in handwriting recognition, a soft keyboard on the screen, voice recognition or a physical keyboard (if the computer is equipped with a keyboard).

The protective shell of a conventional tablet personal computer only protects the external portion of the tablet personal computer, for example, protection of the tablet personal computer in terms of leather sheathes, and for another example, protection of the tablet personal computer pasted with a screen protector or protector. The protective shell of the conventional panel computer may not achieve integral protection of panel operations and tablet personal computer protection.

SUMMARY

The present invention is intended to provide a protective shell for a tablet computer, in order to solve the problem of failure to achieve integral protection in the conventional technical solution.

In one aspect, a protective shell for a tablet personal computer is provided. The protective shell comprises: a protective film, a limiting frame and a protective shell body; wherein the protective film is arranged at an upper portion of the limiting frame, four sides on a frame body inner side surface of the limiting frame being each provided with a limiting bar; a contact portion between the limiting frame and the protective film is in a horizontal plane, the limiting bar being operable to limit the tablet personal computer to prevent the tablet personal computer from moving in the limiting frame; and the limiting frame is fixed in a snap-fit manner to the protective shell body.

Optionally, a contact surface of the protective shell body with the tablet personal computer is provided with a plurality of grooves, the grooves being each provided with an elastomer.

Optionally, a bottom surface of the protective shell body is provided with a support means.

Optionally, the support means comprises: a sliding plate, an angular plate and a support plate; wherein the bottom surface of the protective shell body is provided with a sliding groove mating with the sliding plate, the sliding plate is fixed in a folding manner to one end of the angular plate, the other end of the angular plate is fixed in a folding manner to one end of the support plate, and the other end of the support plate is rotatably connected to a bottom surface of the support means.

Optionally, two ends of a support surface of the support plate are each provided with a U-shaped groove, an opening end of the U-shaped groove being fixed to the support surface.

Optionally, the protective shell further comprises a handrail, two ends of the handrail being respectively fixed to the U-shaped grooves.

Optionally, one side of the limiting frame and the protective shell body are each provided with a key notch, a key protective jacket is snap-fitted into the key notch.

Optionally, the protective film comprises: an AG film, a 180 or 360-degree peep-proof protective film, a tempered glass, a PC film, a PET film, an explosion-proof film or a conducting strip.

According to the embodiments of the present invention, the protective shell for a tablet personal computer provided in the technical solution of the present invention, integral protection is achieved for the screen protector and the tablet personal computer by arranging an upper side film and a snap-fit shell, which thus has the advantage of a better protection effect.

DETAILED DESCRIPTION

Figure 1:
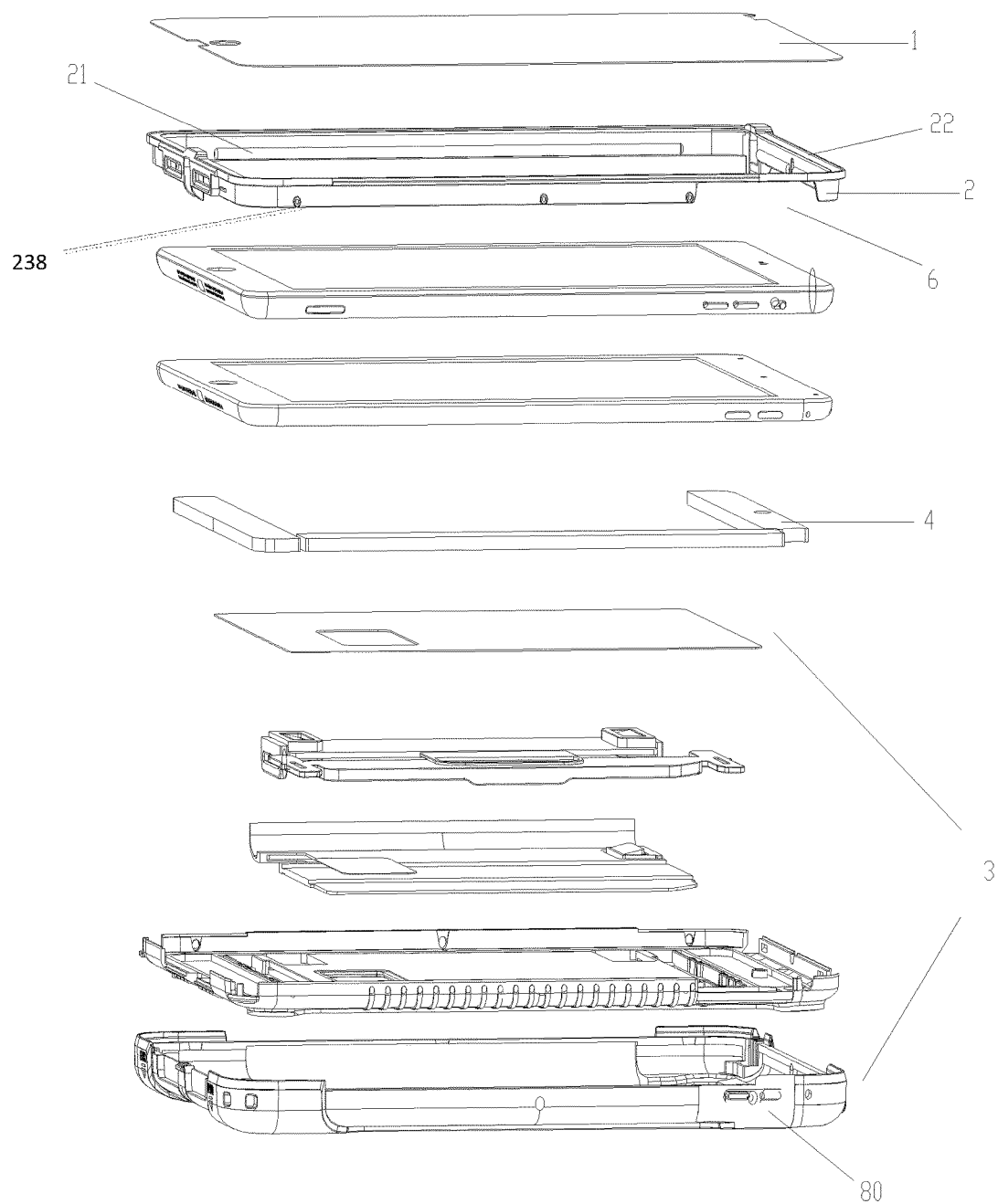
FIG. 1 is an exploded view of a protective shell for a tablet personal computer according to an embodiment of the present invention.

The technical solutions contained in the embodiments of the present invention are described in detail clearly and completely hereinafter with reference to the accompanying drawings for the embodiments of the present invention. Apparently, the described embodiments are only a portion of embodiments of the present invention, but not all the embodiments of the present invention. Based on the embodiments of the present invention, all other embodiments derived by persons of ordinary skill in the art without any creative efforts shall fall within the protection scope of the present invention.

In addition, the following embodiments are described with reference to the attached drawings for illustrating that the present invention may be applied to practice specific embodiments. Furthermore, the directional terms described in the present invention, such as "upper", "lower", "front", "rear", "left", "right", "inner", "outer", "side" and the like, are only directions with reference to the attached drawings. Therefore, the used directional terms are used for better and clearer illustration and understanding of the present invention, instead of indicating or implying that the device or element shall have a particular orientation and shall be structured and operated based on the particular orientation. Accordingly, these terms shall not be construed as limiting the present invention.

In the description of the present invention, it should be noted that unless otherwise specified and defined, the terms "mounted", "coupled" and "connected" and derivative forms of these words shall be understood in a broad sense, which, for example, may be understood as fixed connection, detachable connection or integral connection; may be directly connected, indirectly connected via an intermediate medium or communication between the interiors of two elements. Persons of ordinary skill in the art may understand the specific meanings of the above terms in the present invention according to the actual circumstances and contexts.

In addition, during the description of the present invention, the term "multiple", "more" or "a plurality of" refers to at least two unless otherwise specified. If the term "working procedure" is used in the description, the term does not merely signify an independent working procedure, and also include any procedure or process that is capable of achieving the anticipated effect of this working procedure in case of failure to distinguishing this specific working procedure from the other working procedures. In addition, the "en dash" used in the description denotes a value range in which the values given at a left end and a right end of the "en dash" are respectively used as a minimum value and a maximum value. In the attached drawings, like reference signs are used to denote units having similar or identical structure.

To make the objective, technical solution, and advantages of the present invention clearer, the following section describes the technical solutions of the present invention in combination with the accompanying drawings and embodiments. It should be understood that the embodiments described herein are only exemplary ones for illustrating the present invention, and are not intended to limit the present invention.

Referring to FIG. 1, FIG. 1 illustrates a protective shell for a tablet personal computer according to an embodiment of the present invention. The protective shell comprises: a protective film 1, a limiting frame 2 and a protective shell body 3; wherein the protective film 1 is arranged at an upper portion of the limiting frame 2, four sides on a frame body inner side surface of the limiting frame 2 being each provided with at least one limiting bar 21; a contact portion 22 between the limiting frame 2 and the protective film 1 is in a horizontal plane, the limiting bar 21 being operable to limit the tablet personal computer to prevent the tablet personal computer from moving in the limiting frame 2; and the limiting frame 2 is fixed in a snap-fit manner to the protective shell body 3.

According to a technical solution provided in an embodiment of the present invention, the protective film 1 is arranged at an upper portion of the limiting frame 2, such that the tablet personal computer achieves a screen protection effect with no need of the protective film. In addition, the limiting frame 2 is fixed in a snap-fit manner to the protective shell body 3, such that the protective shell body 3 achieves a protection effect. The protective film 1 arranged at a top surface may protect the screen of the tablet personal computer, such that the tablet personal computer achieves a protection effect without a screen protector. The difficulty of this design lies in that gaps at any positions between the protective film and the screen of the tablet personal computer be less than 0.1 mm, because if the gap between a section of the protective film and the screen of the tablet personal computer is greater than 0.1 mm, the precision of touch control would be greatly lowered. Two technical solutions are employed in the present invention to ensure that the gap is less than 0.1 mm. Firstly, a limiting bar is arranged on each of four sides of a frame body inner side surface of the limiting frame, and in this way, the limiting bars on the four sides are capable of fixing and limiting the entire tablet personal computer within the limiting frame, such that the tablet personal computer may be prevented from moving in the limiting frame. In addition, a portion of the limiting frame, which is in contact with the protective film, is in a horizontal plane, such that the distance between the entire screen of the tablet personal computer and the protective film is less than 0.1 mm, thereby achieving the advantage of a better protection effect.

Figure 2:
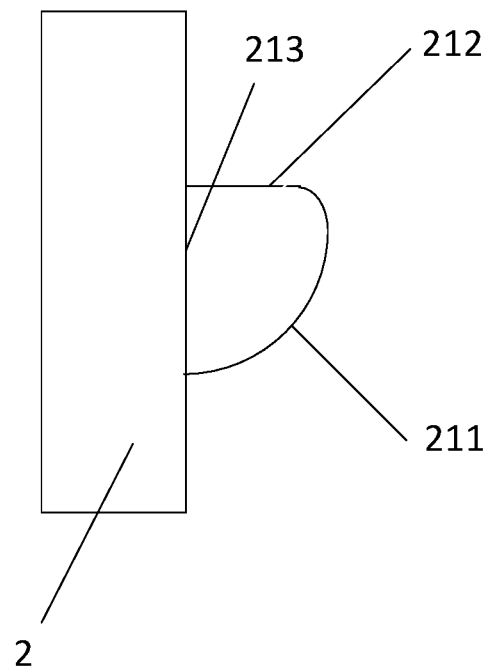
FIG. 2 is a schematic structural view of a limiting bar according to an embodiment of the present invention.

The limiting bar 21 is fixed to a frame body inner side surface of the limiting frame 2. As illustrated in FIG. 2, the limiting bar 21 comprises a guide surface 211, a limiting surface 212 and a fixing surface 213, wherein the fixing surface 213 is fixed to the frame body inner side face of the limiting frame 2, the guide surface 211 forms an angle less than 90 degrees with the fixing surface 213, and the limiting surface 212 is in contact with a lower side of an outer frame body of the tablet personal computer. With such a configuration, it is convenient for a user to fix the tablet personal computer within the limiting frame, and the tablet personal computer is hard to move. Firstly, the limiting bars 4 are arranged on the four sides of the limiting frame, which may securely fix the tablet personal computer. In addition, to ensure that the tablet personal computer can be simply mounted within the limiting frame 2, the guide surface 211 is arranged. In this way, when the user mounts the tablet personal computer, the guide surface 211 would guide the mounting process, such that it is convenient for the user to mount the tablet personal computer within the limiting frame.

Figure 3:
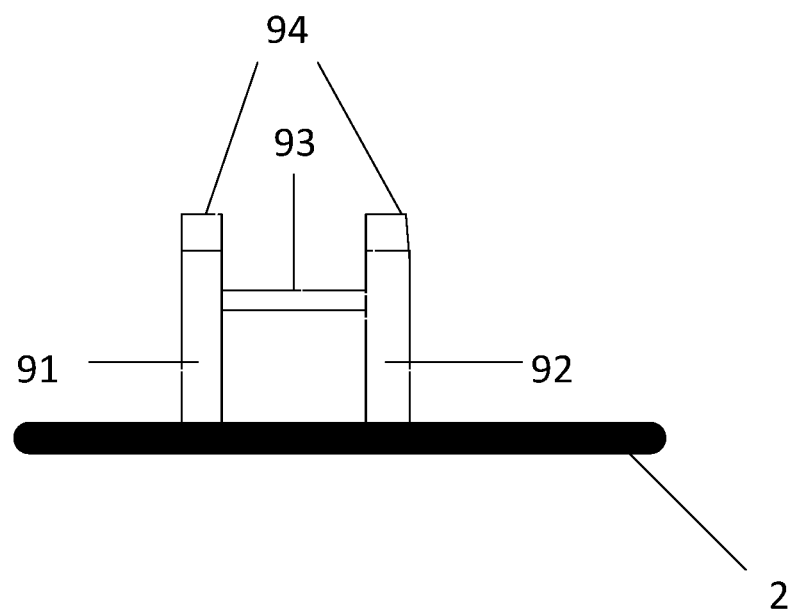
FIG. 3 is a schematic structural view of a mouth-shaped snap-fit port according to an embodiment of the present invention.
Figure 4:
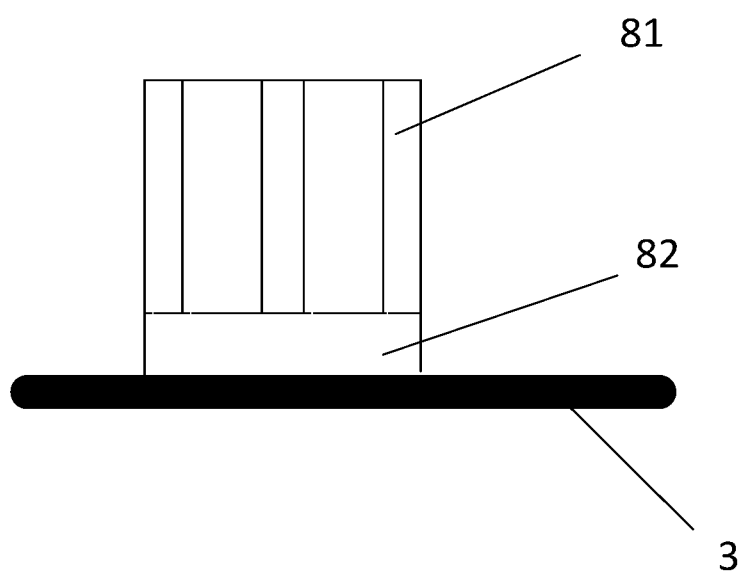
FIG. 4 is a schematic structural view of a joint groove according to an embodiment of the present invention.

Optionally, the limiting frame 2 of the limiting frame 2 and the protective shell 3 specifically comprises: a left side surface and a right side surface of the limiting frame 2 are respectively provided with at least two limiting protrusions 238; a left inner side surface and a right inner side surface of the protective shell body 3 are respectively provided with a mouth-shaped snap-fit port, the mouth-shaped snap-fit port, as illustrated in FIG. 3, comprising a left side surface 91, a right side surface 92 and a transverse rod 93, two ends of the transverse rod 93 being fixed to upper portions of the left side surface 91 and the right side surface 92, one ends of the left side surface 91 and the right side surface 92 being fixed to a framework of the limiting frame 2, the other ends of the left side surface 19 and the right side surface 92 being each provided with a guide arc surface 94; an upper side and a lower side of the protective shell body 3 are respectively provided with a joint groove mating with the mouth-shaped snap-fit port, the joint groove, as illustrated in FIG. 4, comprising a vertical M groove 81 (that is, the cross section thereof may be of an M shape) and an elastic connecting portion 82, one end of the elastic connecting portion 82 being fixed to the upper side or the lower side of the protective shell body 3, the other end of the elastic connecting portion 82 being fixed to the vertical M groove 81, an outer side of the vertical M groove 81 being less than a minimum distance between the left side surface 91 and the right side surface 92. As such, the vertical M groove may be inserted between the left side surface 91 and the right side surface 92, and then after the elastic connecting portion 82 is connected, the transverse rod 93 may achieve upward and downward movements of the limiting frame. The left side surface 91 and the right side surface 92 may be limited into the limiting frame and may move leftward and rightward. In particular, arrangement of the vertical M groove may improve the limiting effect of the transverse rod, thereby achieving the advantage of a better limiting effect.

Optionally, a contact surface (a top surface) the protective shell body 3 with the tablet personal computer is provided with a plurality of grooves, the grooves being each provided with an elastomer 4. The elastomer 4 is made from, but not limited to, a sponge, a rubber or the like material having elasticity, which achieves a shock absorption effect for the tablet personal computer.

Optionally, a bottom surface of the protective shell body 3 is provided with a support means. Arrangement of the support means facilitates supporting of the tablet personal computer, to achieve the effect of long-term use of the tablet personal computer.

Optionally, the support means comprises: a sliding plate, an angular plate and a support plate; wherein the protective shell body 3 is provided with a sliding groove mating with the sliding plate, the sliding plate is fixed in a folding manner to one end of the angular plate, the other end of the angular plate is fixed in a folding manner to one end of the support plate, and the other end of the support plate is rotatably connected to a bottom surface of the support means.

The support means is configured to have three portions, and these three portions are configured to a folding-based fixing configuration because such a configuration provides stability of the support means. With respect to these three portions, folding or rotation may be only achieved in a connecting portion of the three portions, and the other portions may not be folded or rotated. In this way, the mechanical stability of these three portions is greatly enhanced, such that the stress intensity of the support means is improved. In addition, when the support means is not used, the support means may be retracted to be aligned and parallel with the bottom surface, which, however, does not affect normal use of the tablet personal computer. Therefore, the support means has the advantage of a better supporting performance.

Optionally, two ends of a support surface of the support plate are each provided with a U-shaped groove, an opening end of the U-shaped groove being fixed to the support surface. The U-shaped groove implements two functions. One is to provide a support effect in the aspect of height. The other is to arrange a handrail in a notch of the U-shaped groove such that it is convenient for a user to hold the tablet personal computer.

Optionally, one side of the limiting frame 2 and the protective shell 3 are each provided with a key notch 6, a key protective jacket 80 being snap-fitted into the key notch 6. Such a configuration is to ensure that one protective jacket may be used by a plurality of tablet personal computers. For a tablet personal computer, the overall dimension thereof is relatively fixed. For example, most Apple iPad series tablet personal computers have an overall dimensional of 9.7 inches, but they are different in terms of thickness and keys. Therefore, by arranging a key notch 6, such differences may be prevented. By arranging an elastomer 4, the difference in height may be prevented. Therefore, such configurations have great adaptability.

Optionally, the protective film may be specifically: any one or a plurality of an anti-glare series protective film (an AG film), a 180 or 360-degree peep-proof protective film, a tempered glass, a polycarbonate (PC) film, a polyethylene terephthalate (PET) film, an explosion-proof film and a conducting strip.

The protective film using the above materials has the advantages of good touch control effect, anti-glare effect, peep-proof effect and good protection. The anti-glare protective film, the 180 or 360-degree peep-proof protective film and the explosion-proof film may be made from a material in the related art.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A protective shell for a tablet personal computer, comprising: a protective film, a limiting frame and a protective shell body; wherein
the protective film is arranged at an upper portion of the limiting frame, four sides on a frame body inner side surface of the limiting frame being each provided with a limiting bar; a contact portion between the limiting frame and the protective film is in a horizontal plane, the limiting bar being operable to limit the tablet personal computer to prevent the tablet personal computer from moving in the limiting frame; and the limiting frame is fixed in a snap-fit manner to the protective shell body;
a bottom surface of the protective shell body is provided with a support means which comprises: a sliding plate, an angular plate and a support plate; wherein the bottom surface of the protective shell is provided with a sliding groove mating with the sliding plate, the sliding plate is fixed in a folding manner to one end of the angular plate, the other end of the angular plate is fixed in a folding manner to one end of the support plate, and the other end of the support plate is rotatably connected to a bottom surface of the support means.

2. The protective shell for a tablet personal computer according to claim 1, wherein a contact surface of the protective shell body with the tablet personal computer is provided with a plurality of grooves, the grooves being each provided with an elastomer.

3. The protective shell for a tablet personal computer according to claim 1, wherein two ends of a support surface of the support plate are each provided with a U-shaped groove, an opening end of the U-shaped groove being fixed to the support surface.

4. The protective shell for a tablet personal computer according to claim 3, wherein the protective shell further comprises a handrail, two ends of the handrail being respectively fixed to the U-shaped grooves.

5. The protective shell for a tablet personal computer according to claim 1, wherein one sides of the limiting frame and the protective shell body are each provided with a key notch, a key protective jacket being snap-fitted into the key notch.

6. The protective shell for a tablet personal computer according to claim 1, wherein the protective film comprises: an AG film, a 180 or 360-degree peep-proof protective film, a tempered glass, a PC film, a PET film, an explosion-proof film or a conducting strip.

7. The protective shell for a tablet personal computer according to claim 1, wherein the limiting bar is fixed to the frame body inner side surface of the limiting frame, the limiting bar comprise a guide plane, a limiting surface and a fixing surface; wherein the fixing surface is fixed to the frame body inner side surface of the limiting frame, the guide surface forms an angle less than 90 degrees with the fixing surface, and the limiting surface is in contact with a lower side of an outer frame body of the tablet personal computer.

8. The protective shell for a tablet personal computer according to claim 7, wherein the snap-fitting of the limiting frame and the protective shell specifically comprises: a left side surface and a right side surface of the limiting frame are respectively provided with at least two limiting protrusions; a left inner side surface and a right inner side surface of the protective shell body are respectively provided with a mouth-shaped snap-fit port, the mouth-shaped snap-fit port comprising a left side surface, a right side surface and a transverse rod, two ends of the transverse rod being fixed to upper portions of the left side surface and the right side surface, one ends of the left side surface and the right side surface being fixed to a framework of the limiting frame, the other ends of the left side surface and the right side surface being each provided with a guide arc surface; an upper side and a lower side of the protective shell body are respectively provided with a joint groove mating with the mouth-shaped snap-fit port, the joint groove comprising a vertical M groove and an elastic connecting portion, one end of the elastic connecting portion being fixed to the upper side or the lower side of the protective shell body, the other end of the elastic connecting portion being fixed to the vertical M groove, an outer side of the vertical M groove being less than a minimum distance between the left side surface and the right side surface.

\* \* \* \* \*